(12) United States Patent
Choi

(10) Patent No.: US 7,853,291 B2
(45) Date of Patent: Dec. 14, 2010

(54) MOBILE TERMINAL HAVING AN EVENT NOTIFICATION FUNCTION AND METHOD THEREOF

(75) Inventor: Ju Young Choi, Andong-si (KR)

(73) Assignee: LG Electronics Inc., Seoul (KR)

( * ) Notice: Subject to any disclaimer, the term of this patent is extended or adjusted under 35 U.S.C. 154(b) by 594 days.

(21) Appl. No.: 11/457,560

(22) Filed: Jul. 14, 2006

(65) Prior Publication Data

US 2007/0015503 A1    Jan. 18, 2007

(30) Foreign Application Priority Data

Jul. 15, 2005   (KR) .................. 10-2005-0064299

(51) Int. Cl.
*H04M 1/00* (2006.01)

(52) U.S. Cl. .............. 455/556.1; 455/404.1; 455/404.2; 455/456.1

(58) Field of Classification Search ............ 455/425, 455/456.1, 456.2, 456.5, 456.6, 414.1, 414.2, 455/441, 41.2, 41.3, 404.1, 404.2, 420, 421, 455/344, 67.11, 550.1, 556.1, 557; 342/357.04, 342/357.17, 357.01, 357.1; 348/154, 155; 382/312–315; 235/439, 440

See application file for complete search history.

(56) References Cited

U.S. PATENT DOCUMENTS

| | | | | |
|---|---|---|---|---|
| 5,255,341 A * | 10/1993 | Nakajima | .................. | 704/200 |
| 5,712,911 A * | 1/1998 | Her | .................. | 379/388.01 |
| 5,810,201 A * | 9/1998 | Besse et al. | .................. | 222/39 |
| 5,987,119 A * | 11/1999 | Lee | .................. | 379/379 |
| 6,002,763 A * | 12/1999 | Lester et al. | .................. | 379/421 |
| 6,310,955 B1 * | 10/2001 | Reeves | .................. | 379/424 |
| 6,418,536 B1 * | 7/2002 | Park | .................. | 713/323 |
| 6,526,335 B1 * | 2/2003 | Treyz et al. | .................. | 701/1 |
| 6,669,286 B2 * | 12/2003 | Iusim | .................. | 297/217.4 |
| 6,728,349 B2 * | 4/2004 | Chang et al. | .................. | 379/93.23 |
| 6,781,570 B1 * | 8/2004 | Arrigo et al. | .................. | 345/158 |
| 6,825,453 B2 * | 11/2004 | Kang et al. | .................. | 219/702 |
| 6,889,382 B1 * | 5/2005 | Anderson | .................. | 725/10 |
| 7,042,391 B2 * | 5/2006 | Meunier et al. | .................. | 342/357.02 |
| 7,058,412 B2 * | 6/2006 | Lowe et al. | .................. | 455/456.3 |
| 7,120,238 B1 * | 10/2006 | Bednarz et al. | .................. | 379/201.1 |
| 7,164,411 B2 * | 1/2007 | Keranen et al. | .................. | 345/156 |
| 7,272,385 B2 * | 9/2007 | Mirouze et al. | .................. | 455/414.1 |
| 7,296,841 B2 * | 11/2007 | Vassy | .................. | 296/76 |
| 7,403,194 B2 * | 7/2008 | Gu | .................. | 345/204 |
| 7,502,450 B2 * | 3/2009 | Sakai et al. | .................. | 379/93.35 |
| 2003/0115240 A1 * | 6/2003 | Cho | .................. | 709/102 |

(Continued)

FOREIGN PATENT DOCUMENTS

JP    03-212048 A    9/1991

*Primary Examiner*—Dominic E Rego
(74) *Attorney, Agent, or Firm*—Birch, Stewart, Kolasch & Birch, LLP

(57) ABSTRACT

A mobile terminal having an event notification function which includes a user presence sensor that detects the presence of a user of the mobile terminal, a controller that detects the occurrence of an event, switches the user presence sensor on when it detects the occurrence of the event, and generates a control signal to notify a user of the occurrence of the event when the user presence sensor detects the presence of the user, and an output unit that receives the control signal and notifies the user of the occurrence of the event.

25 Claims, 2 Drawing Sheets

U.S. PATENT DOCUMENTS

| | | | |
|---|---|---|---|
| 2003/0224805 A1* | 12/2003 | Suenaga | 455/456.1 |
| 2004/0194700 A1* | 10/2004 | Estelle | 118/682 |
| 2005/0136994 A1* | 6/2005 | Bahl et al. | 455/574 |
| 2005/0151638 A1* | 7/2005 | Oppedahl et al. | 340/531 |
| 2006/0223547 A1* | 10/2006 | Chin et al. | 455/456.1 |
| 2006/0229118 A1* | 10/2006 | Kaneko | 455/575.3 |
| 2007/0171503 A1* | 7/2007 | Luo | 359/237 |
| 2008/0045194 A1* | 2/2008 | Gilhuly et al. | 455/414.2 |

* cited by examiner

MOBILE TERMINAL HAVING AN EVENT NOTIFICATION FUNCTION AND METHOD THEREOF

This application claims the benefit of Korean Patent Application No. 10-2005-0064299, filed on Jul. 15, 2005, which is hereby incorporated by reference as if fully set forth herein.

BACKGROUND OF THE INVENTION

1. Field of the Invention

The present invention relates to a mobile terminal, and more particularly to a mobile terminal equipped with an event notification function.

2. Discussion of the Related Art

Conventional mobile terminals are typically designed to notify a user when a predetermined event has occurred, such as when the user has missed an incoming call, or has received a message. Typically, the conventional mobile terminals will notify a user of the event by outputting a sound or vibrating.

When a user of a conventional mobile terminal receives an incoming call from a base station, but does not respond within a predetermined period of time, the conventional mobile terminal determines that the user has missed an incoming call, and typically displays certain information relating to the missed call on a display of the mobile terminal (such as, for example, caller information, number of missed calls, and/or missed call content information).

When a conventional mobile terminal receives an incoming message, it typically outputs a sound or vibrates, and displays a received message indicator on the display of the mobile terminal. If the user does not check the received message, typically the conventional mobile terminal will periodically output a sound or vibrate, or display the received message indicator on the display of the mobile terminal.

However, a user of a conventional mobile terminal will be unaware that he or she has missed a call if they do not view the mobile terminal's display. Thus, if they miss an important call, they may not realize it for a long period of time.

Thus, to be aware of any missed calls, a user of a conventional mobile terminal must periodically check the display of the mobile terminal, which is an inconvenience. Further, if a user is visually impaired, they will be unable to recognize that they have missed a call.

Although a conventional mobile terminal may periodically output a sound or vibrate to indicate that it has received a message, this is not helpful if the mobile terminal outputs the sound or vibrates when the user is not in the vicinity of the mobile terminal.

SUMMARY OF THE INVENTION

In view of the foregoing, the present invention, through one or more of its various aspects, embodiments, and/or specific features or sub-components, is thus intended to bring out one or more of the advantages as specifically noted below.

An object of the present invention is to provide a mobile terminal with the capability of detecting the presence of a user, and notifying the user of the occurrence of an event when the user is present.

To achieve at least this object, there is provided a mobile terminal having an event notification function, which includes a user presence sensor that detects the presence of a user of the mobile terminal, a controller that detects the occurrence of a predetermined event, switches the user presence sensor on when it detects the occurrence of the predetermined event, and generates a control signal to notify a user of the occurrence of the predetermined event when the user presence sensor detects the presence of the user, and an output unit that receives the control signal and notifies the user of the occurrence of the predetermined event.

The user presence sensor may include a motion detector. The motion detector may be a three-axis acceleration sensor. The controller may generate the control signal when a detected motion variation value is equal to or greater than a predetermined reference value.

The predetermined event may be one of a missed call event and a message reception event. The controller may stop notification by the output unit to the user upon receiving a predetermined interrupt signal. The interrupt signal may be generated when the user manipulates an input unit or when the user opens a cover of the mobile terminal.

The output unit may output a predetermined sound and/or a vibration to notify the user of the occurrence of the predetermined event. The output unit may switch on a light emitting diode (LED) contained in the mobile terminal, or cause the LED to blink to notify the user of the occurrence of the predetermined event.

The user presence sensor may include a temperature sensor that detects a body temperature of a user. The temperature sensor may be a contact type temperature sensor or a non contact-type temperature sensor. The temperature sensor may sense a body temperature of the user when it comes into contact with the user, or it may sense a body temperature of the user when it comes within a certain distance of the user.

There is also provided a method for notifying a user of a mobile terminal of the occurrence of an event which includes detecting the occurrence of a predetermined event, detecting the presence of the user of the mobile terminal after the occurrence of the predetermined event has been detected, and notifying the user of the occurrence of the predetermined event when the presence of the user has been detected.

Detecting the presence of the user may include detecting a motion of the mobile terminal. The motion of the mobile terminal may be detected by a three-axis acceleration sensor contained in the mobile terminal. Detecting the presence of the user may include determining whether a motion variation value of the mobile terminal is equal to or greater than a predetermined reference value.

The predetermined event may include a missed call event or a message reception event. Notifying the user of the occurrence of the predetermined event may include outputting a predetermined sound and/or a vibration, or switching on a LED contained in the mobile terminal or causing the LED to blink.

The method may include stopping the notification to the user of the occurrence of the predetermined event upon receiving a predetermined interrupt signal. The interrupt signal may be generated when the user manipulates an input unit or when the user opens a cover of the mobile terminal.

Detecting the presence of the user may include detecting a body temperature of the user. The body temperature of the user may be detected when a contact type sensor of the mobile terminal is brought into contact with the user, or may be detected when a non-contact type sensor of the mobile terminal is brought within a certain distance of the user.

There is also provided a computer readable medium which stores a program for notifying a user of a mobile terminal of the occurrence of an event. The program includes event detection code that detects the occurrence of a predetermined event, presence detecting code that detects the presence of the user of the mobile terminal after the occurrence of the predetermined event has been detected, and user notification code that notifies the user of the occurrence of the predetermined event when the presence of the user has been detected. The program may also include notification stopping code that stops the notification to the user of the occurrence of the predetermined event when a predetermined interrupt signal is received.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF THE INVENTION

Described below is a mobile terminal having an event notification function, and a method for notifying a user of the mobile terminal of the occurrence of an event.

Figure 1:
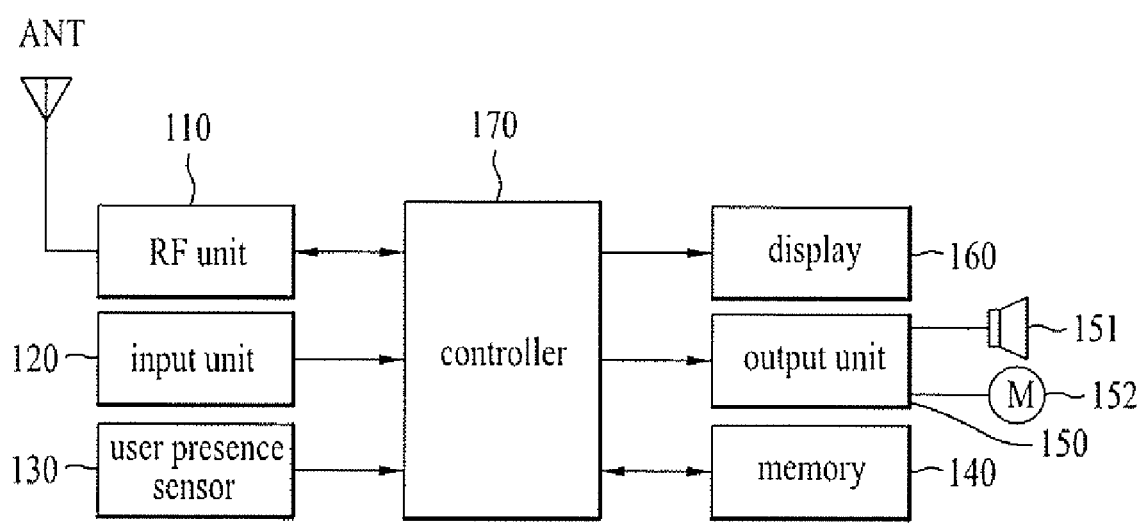
FIG. 1 is a block diagram illustrating a mobile terminal having an event notification function according to one aspect of the present invention.

FIG. 1 is a block diagram illustrating a mobile terminal (such as, but not limited to, a cellular phone or PDA) having an event notification function. Referring to FIG. 1, the mobile terminal includes a radio frequency (RF) unit 110, an input unit 120, a user presence sensor 130, a memory 140, an output unit 150, and a display 160.

When a call is placed to the mobile terminal, the RF unit 110 receives a call-connection request signal via an antenna (ANT). The RF unit 110 also receives messages via the antenna (ANT), such as, but not limited to, text messages and messages indicating the receipt of new voice mail.

The input unit 120 functions as a user interface. Non-limiting examples of the input unit 120 include a keypad having number keys and/or function keys, a touch screen display, and a microphone for receiving commands spoken by a user. The input unit 120 sends input signals to a controller 170 to control operations of the mobile terminal.

The user presence sensor 130 detects the presence of a user, and may be implemented in a variety of forms. Non-limiting examples include a motion sensor, a temperature sensor (contact or non-contact type), a photosensor, an audio sensor, or a combination of sensors. For example, according to one embodiment, the sensor may take the form of a three-axis acceleration motion sensor which senses planar or spatial movement of the mobile terminal if it is picked up or moved by a user.

The sensor 130 is switched on and off by the controller 170, and provides detection signals to the controller 170.

The memory 140 stores not only programs for controlling operations of the mobile terminal, but also stores input/output (I/O) data generated when the mobile terminal is controlled.

The output unit 150 can provide output in any suitable manner, such as visual, audio or motion. As shown in FIG. 1, the output unit 150 includes a speaker 151, and may also include a vibration motor 152. The output unit 150 is switched on and off by the controller 170. The controller 170 controls the output unit 150 to output a predetermined sound and/or vibrate to notify a user of the occurrence of a predetermined event.

Non-limiting examples of predetermined events which may trigger the controller 170 to control the output unit 150 to notify a user include, but are not limited to, a missed incoming call, receipt of a text message, receipt of an indication that a user has received voice mail, receipt of stock, weather, traffic or news updates (which types of updates could, for example, be preset or pre-selected by a user), or receipt of any other types of messages.

The speaker 151 audibly outputs sounds such as, but not limited to, MIDI sound (e.g., ringtones, sound effects, etc.) and voice data stored in the memory 140. The vibration motor 152 vibrates in response to a control signal from the controller 170.

The display 160 is configured to display various information. For example, when a user misses one or more incoming calls, the display 160 may display information relating to the missed call(s), such as information identifying the caller, and the number of calls the user has missed. The display 160 may also display messages, or listings of messages, received by the mobile terminal.

The controller 170 controls overall operations of the mobile terminal, and performs an event notification function, as described hereinafter in detail.

The controller 170 is programmed to detect when predetermined events have occurred. For example, the controller 170 determines when a user of the mobile terminal misses incoming call(s), and in response thereto, controls the display 160 to display information relating to the missed call(s), such as information identifying the caller, and the number of calls the user has missed. The controller 170 also controls the display 160 to display messages, or listings of messages, received by the mobile terminal.

When the controller determines that a predetermined event has occurred, the controller switches the user presence sensor 130 on. When the user presence sensor 130 detects the presence of a user, the sensor 130 signals the user presence to the controller 170, and the controller 170 notifies the user of the occurrence of the predetermined event. In one embodiment, the controller 170 notifies the user by sending a control signal to the output unit 150 to output a predetermined sound and/or vibrate. In other embodiments, the controller 170 notifies the user of the predetermined event via other methods (such as, for example, sending a control signal to periodically display text or images on the display 160, or cause a light emitting diode (LED) to blink on and off).

In an embodiment in which the user presence sensor 130 is implemented by a motion detector, the motion detector or controller 170 may determine that a user is present by comparing a detected motion variation value with a predetermined reference value, and determine that the user is present when the detected motion variation value is equal to or greater than the predetermined reference value.

In an embodiment in which the user presence sensor 130 is implemented by a temperature sensor, either of a contact-type or non-contact type, the temperature sensor or controller 170 may determine that a user is present when the sensor detects a body temperature value which is equal to or greater than a predetermined temperature value, which may be stored in the memory 140. For example, the predetermined temperature may be 36.5° C., which is the approximate body temperature of a human being.

Alternatively the temperature detected by the temperature sensor may be compared to a range of predetermined temperature values, such as 36.5° C.±A° C., where the value of A may be set by a user.

If the temperature sensor is a contact type sensor, it detects a temperature when it is brought into contact with the user. If the temperature sensor is a non-contact type sensor, it detects a temperature when it is brought within a certain distance of the user.

When the controller 170 receives a predetermined interrupt signal, the controller 170 controls the mobile terminal to stop the event notification processes (for example, controls the output unit 150 to cease outputting the predetermined sound or vibrating, controls the display to cease displaying the text or images, or controls the LED to cease blinking).

The interrupt signal can be generated, for example, when the user manipulates the input unit 120 (such as by pressing a key). If the mobile terminal includes a cover which flips or slides open (such as a "flip phone") the interrupt signal may alternatively or additionally be generated when the mobile terminal senses that the user has flipped or slid the cover open.

Figure 2:
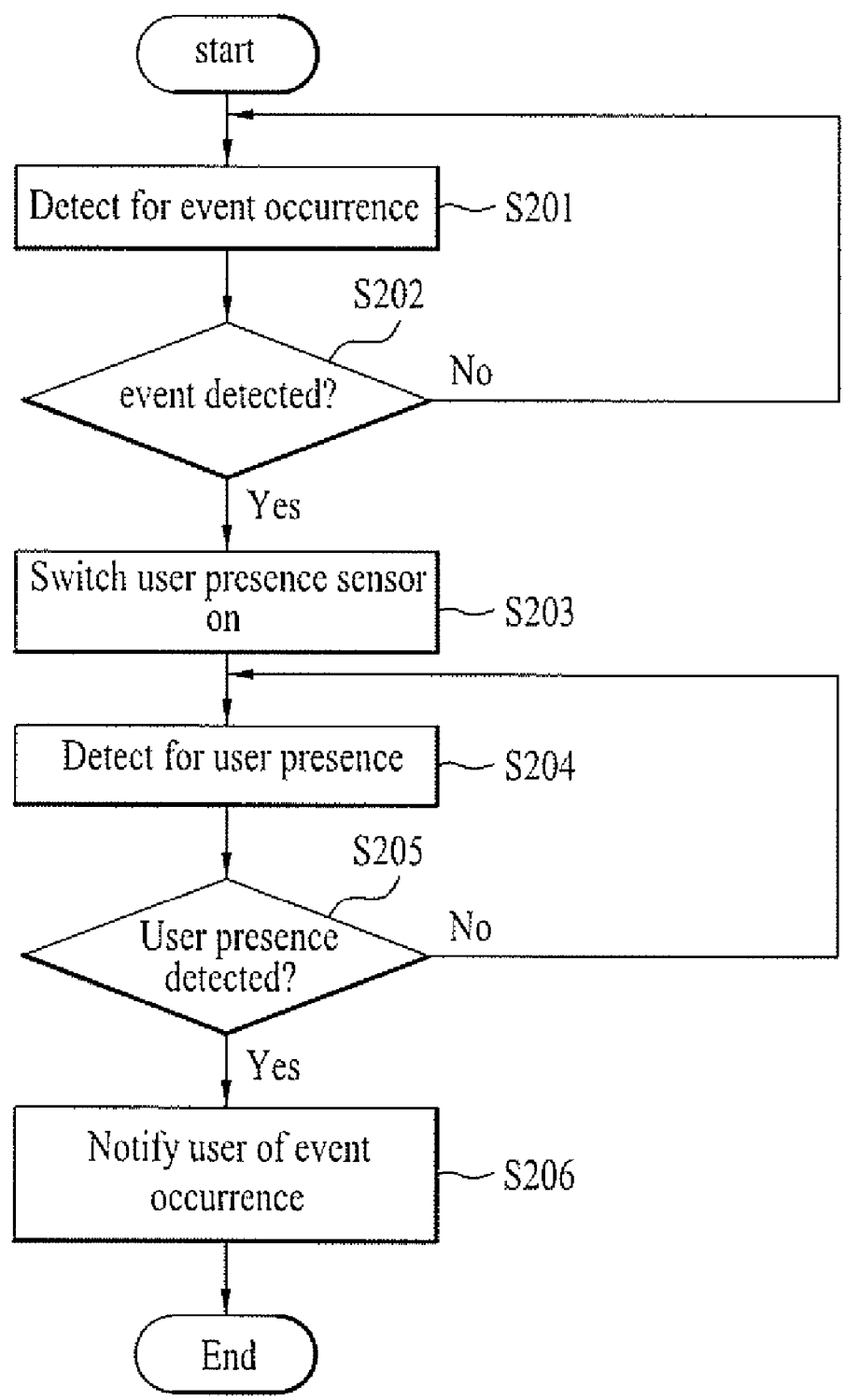
FIG. 2 is a flow chart illustrating a method for notifying a user of a mobile terminal of the occurrence of an event according to one aspect of the present invention

FIG. 2 is a flow chart illustrating a method for notifying a user of a mobile terminal of the occurrence of an event. Referring to FIG. 2, the controller 170 of the mobile terminal detects for the occurrence of a predetermined event at step 201.

If the controller 170 determines that an event has occurred at step S202 (for example, if the user has missed a call or has received a message), it switches the user presence sensor 130 on at step S203.

The controller 170 detects for the presence of the user via the user presence sensor 130 at step S204.

When the user presence sensor 130 detects the presence of the user at step S205, the controller 170 controls the mobile terminal to notify the user at step S206 (such as by controlling the output unit 150 to output a sound or vibrate, controlling the display 160 to display text or images, or causing an LED to blink).

When the controller 170 receives an interrupt signal (such as when a user manipulates the input unit 120, or flips or slides open a cover on the mobile terminal), the controller 170 stops the event notification processes of the mobile terminal.

The mobile terminal and method described above detects the occurrence of a predetermined event, and then notifies the user of the occurrence of the predetermined event when it detects that the user is in the presence of the mobile terminal. Further, although the predetermined events as described above are generally externally generated, such as missed calls or received messages, the predetermined event could be internally generated, such as an operating condition of the mobile terminal (such as, for example, a low battery condition or out of service area condition).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

In accordance with various embodiments of the present disclosure, the methods described herein may be implemented by software programs executable by a processor. The present disclosure contemplates a computer-readable medium that includes instructions or receives and executes instructions responsive to a propagated signal. The term "computer-readable medium" shall include any medium that is capable of storing, encoding or carrying a set of instructions for execution by a processor to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. As the present invention may be embodied in several forms without departing from the spirit or essential characteristics thereof, it should also be understood that the above-described embodiments are not limited by any of the details of the foregoing description, unless otherwise specified. Rather, the above-described embodiments should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A mobile terminal comprising:
a user presence sensor configured to detect the presence of a user of the mobile terminal;
a radio frequency unit configured to wirelessly receive a call or a message;
a controller configured to determine the occurrence of a missed call or missed message when the user does not respond to the received call or received message within a predetermined period of time, the controller configured to operate the user presence sensor after the occurrence of the missed call or missed message has been determined and not while the radio frequency unit is receiving the call or the message, the controller configured to generate a control signal to notify the user of the occurrence of the missed call or missed message when the user presence sensor detects the presence of the user; and an output unit configured to receive the control signal and notifies the user of the occurrence of the missed call or missed message.

2. The mobile terminal according to claim 1, wherein the user presence sensor is a motion detector.

3. The mobile terminal according to claim 2, wherein the motion detector is a three-axis acceleration sensor.

4. The mobile terminal according to claim 2, wherein the controller generates the control signal when a detected motion variation value is equal to or greater than a predetermined reference value.

5. The mobile terminal according to claim 1, wherein the controller stops notification by the output unit to the user upon receiving a predetermined interrupt signal.

6. The mobile terminal according to claim 5, wherein the interrupt signal is generated when at least one of the user manipulates an input unit and the user opens a cover of the mobile terminal.

7. The mobile terminal according to claim 1, wherein the output unit outputs at least one of a predetermined sound and a vibration to notify of the occurrence of the missed call or missed message.

8. The mobile terminal according to claim 1, wherein the output unit switches on a light emitting diode (LED) contained in the mobile terminal, or causes the LED to blink, to notify of the occurrence of the missed call or missed message.

9. The mobile terminal according to claim 1, wherein the user presence sensor comprises a temperature sensor that detects a body temperature of a user.

10. The mobile terminal according to claim 9, wherein the temperature sensor is one of a contact type temperature sensor and a non contact-type temperature sensor.

11. The mobile terminal according to claim 9, wherein the temperature sensor senses a body temperature of the user when it comes into contact with the user.

12. The mobile terminal according to claim 9, wherein the temperature sensor senses a body temperature of the user when it comes within a certain distance of the user.

13. A method for notifying a user of a mobile terminal of the occurrence of an event, comprising:
receiving a call or a message;
determining an occurrence of a missed call or a missed message when the user does not respond to the received call or received message within a predetermined period of time;
detecting the presence of the user after the occurrence of the missed call or missed message has been determined and not while receiving the call or the message; and
notifying the user of the occurrence of the missed call or missed message when the presence of the user has been detected.

14. The method according to claim 13, wherein detecting the presence of the user comprises detecting a motion of the mobile terminal.

15. The method according to claim 14, wherein the motion of the mobile terminal is detected by a three-axis acceleration sensor contained in the mobile terminal.

16. The method according to claim 14, wherein detecting the presence of the user comprises determining whether a motion variation value of the mobile terminal is equal to or greater than a predetermined reference value.

17. The method according to claim 13, wherein notifying of the occurrence of the missed call or missed message comprises outputting at least one of a predetermined sound and a vibration.

18. The method according to claim 13, wherein notifying of the occurrence of the missed call or missed message comprises one of switching on a light emitting diode (LED) contained in the mobile terminal and causing the LED to blink.

19. The method according to claim 13, further comprising stopping the notification of the occurrence of the missed call or missed message upon receiving a predetermined interrupt signal.

20. The method according to claim 19, wherein the interrupt signal is generated when at least one of the user manipulates an input unit and the user opens a cover of the mobile terminal.

21. The method according to claim 13, wherein detecting the presence of the user comprises detecting a body temperature of the user.

22. The method according to claim 21, wherein the body temperature of the user is detected when a contact type sensor of the mobile terminal is brought into contact with the user.

23. The method according to claim 21, wherein the body temperature of the user is detected when a non-contact type sensor of the mobile terminal is brought within a certain distance of the user.

24. A computer readable medium which stores a program for notifying a user of a mobile terminal of the occurrence of an event, the program comprising:
radio frequency reception code configured to receive a call or a message;
absence determination code configured to determine the occurrence of a missed call or a missed message when the user does not respond to the received call or received message within a predetermined period of time;
presence detecting code configured to detect the presence of the user after the occurrence of the missed call or missed message has been detected and not during the reception of the call or the message; and
user notification code that notifies the user of the occurrence of the missed call or missed message when the presence of the user has been detected.

25. The computer readable medium according to claim 24, wherein the program further comprising notification stopping code that stops the notification to of the occurrence of the missed call or missed message when a predetermined interrupt signal is received.

* * * * *